(12) United States Patent
Reynolds

(10) Patent No.: US 6,277,440 B1
(45) Date of Patent: Aug. 21, 2001

(54) PREPARATION OF CERAMIC MATRIX COMPOSITES BY INFILTRATION OF FIBROUS PREFORMS WITH FLUIDS OR SLURRIES AND SUBSEQUENT PYROLYSIS

(75) Inventor: George H. Reynolds, San Marcos, CA (US)

(73) Assignee: MSNW, Inc., San Marcos, CA (US)

( * ) Notice: Subject to any disclaimer, the term of this patent is extended or adjusted under 35 U.S.C. 154(b) by 0 days.

(21) Appl. No.: 09/198,188

(22) Filed: Nov. 23, 1998

(51) Int. Cl.⁷ .......................................................... B05D 3/02
(52) U.S. Cl. ..................... 427/226; 427/228; 427/380; 427/381
(58) Field of Search .................................... 427/228, 227, 427/226, 380, 381

(56) References Cited

U.S. PATENT DOCUMENTS

| | | |
|---|---|---|
| 3,432,336 | 3/1969 | Langrod et al. . |
| 4,196,230 | 4/1980 | Gibson et al. . |
| 4,576,836 | 3/1986 | Colmet et al. ........................ 427/255 |
| 4,752,503 | 6/1988 | Thebault ............................ 427/248.1 |
| 4,880,757 | 11/1989 | Henslee et al. ........................ 501/104 |
| 5,064,788 | 11/1991 | Newkirk et al. ........................ 501/92 |
| 5,079,039 | 1/1992 | Heraud et al. ........................ 427/249 |
| 5,108,965 | 4/1992 | Tani et al. ................................ 501/92 |
| 5,110,771 | 5/1992 | Carpenter et al. ...................... 501/95 |
| 5,334,562 | 8/1994 | Newkirk et al. ........................ 501/88 |
| 5,336,522 | * 8/1994 | Baldhadere et al. .................. 427/226 |
| 5,407,734 | 4/1995 | Singh et al. ........................... 428/224 |
| 5,422,319 | 6/1995 | Stempin et al. ........................... 501/9 |
| 5,455,106 | 10/1995 | Steffier ................................. 428/229 |
| 5,510,303 | 4/1996 | Kameda et al. ........................ 501/92 |
| 5,552,352 | 9/1996 | Brun et al. ............................. 501/88 |
| 5,571,758 | 11/1996 | Grossman ............................. 501/92 |
| 5,635,250 | * 6/1997 | Blum et al. ........................... 427/228 |
| 5,759,620 | 6/1998 | Wilson et al. ........................ 427/228 |
| 5,854,154 | 12/1998 | Radford et al. ..................... 501/95.2 |

* cited by examiner

*Primary Examiner*—Erma Cameron
(74) *Attorney, Agent, or Firm*—Morrison & Foerster, LLP

(57) ABSTRACT

This invention is a fiber-reinforced ceramic matrix composite and a method for their fabrication. The precursors of the ceramic matrix phase are impregnated into the fibrous preform or-applied to the surface of the fiber as fluids. The preform or fibers are then thermally processed to convert the precursor compounds to the desired refractory materials, e.g., carbides, borides, or nitrides. The density and other properties of the composites may be enhanced further by using a hybrid process that combines fluid infiltration and thermal treatment with chemical vapor infiltration.

21 Claims, No Drawings

PREPARATION OF CERAMIC MATRIX COMPOSITES BY INFILTRATION OF FIBROUS PREFORMS WITH FLUIDS OR SLURRIES AND SUBSEQUENT PYROLYSIS

FIELD OF THE INVENTION

The present invention relates generally to composite materials containing high strength fibers in a matrix of a refractory carbide, boride or nitride, and more particularly to a rapid low-cost process for fabricating carbon fiber-ceramic matrix composites.

BACKGROUND OF THE INVENTION

Ceramic matrix composites (CMCS) are a class of structural materials for service at very high temperatures that have a variety of applications in the aerospace, aircraft propulsion, and power generation industries. Among these applications are rocket nozzles, turbine engine components, and heat exchangers.

Processes for making CMCs start with a preform of high strength fibers that retain their strength at high temperatures (for example carbon, a metal carbide, or a metal oxide). The preform may be prepared by a variety of processes similar to those used in the textile industry that either directly yield useful shapes or produce material, such as woven fabric, that may be subsequently shaped.

The fiber preform is consolidated by emplacing therein a matrix of ceramic material by one of several methods such as chemical vapor infiltration (CVI), gas phase reaction bonding, liquid phase reaction bonding, or slurry infiltration followed by hot pressing.

In the CVI process, illustrated by U.S. Pat. No. 5,079,039 to Heraud et. al., a reactive gas or mixture of gases simultaneously infiltrates the preform and pyrolyzes to form a ceramic matrix. CVI requires sophisticated and expensive equipment and, due to the necessity for operating under conditions where the deposition rate is low, is a slow and inefficient process when used as the sole process to fabricate CMCs.

The gas phase reaction bonding process has been developed primarily for silicon nitride matrix CMCs, where a green body made with silicon powder is nitrided with nitrogen gas. This process is illustrated by U.S. Pat. No. 5,510,303 to Kameda et al., which discloses a CMC material manufactured by forming a matrix containing reaction sintered silicon carbide as the primary component and nitriding the free metal silicon produced in the sintering process to convert it to silicon nitride. Gas phase reaction bonding has been developed only for silicon nitride and silicon carbide matrices.

Liquid phase reaction bonding has been used primarily for the production of silicon carbide matrix composites by infiltrating a preform containing carbon particles with liquid silicon. After reaction, the matrix consists of SiC and usually some free silicon. This process is illustrated by U.S. Pat. No. 5,552,352 to Brun et al., which discloses a composite fabricated from coated reinforcement fibers admixed with a carbonaceous material which is infiltrated with molten silicon. Liquid phase reaction bonding has been developed only for silicon carbide and silicon matrices.

In the slurry infiltration process, typically a tow is passed through a slurry containing matrix material, wound onto a drum, dried, laid up in the desired configuration, and hot pressed, as illustrated by U.S. Pat. No. 5,407,734 to Singh et al. Processes that use slurry infiltration followed by hot pressing require equipment operating at high pressures and temperatures in excess of 1800° C. to 2000° C.

Other methods of preparation involving fluid precursors have been suggested which involve the use of oxygen-free organometallic precursors. In general, however, the precursor materials employed are extremely air and moisture sensitive and require expensive inert environment fabrication.

In addition to the basic techniques for fabricating CMCs as summarized above, various additional processing steps can be integrated into the fabrication process to enhance various properties. The use of such additional steps obviously depend upon the intended use of the final CMC product. One such well-known step is the use of an interface coating to enhance the mechanical properties of a CMC, as exemplified by the teaching in U.S. Pat. No. 4,752,503 to Thebault. Such a coating consists of carbon or boron nitride applied by a CVI process. Other techniques are disclosed in U.S. Pat. No. 5,110,771 to Carpenter et al., U.S. Pat. No. 5,455,106 to Steffier, and U.S. Pat. No. 5,422,319 to Stempin et al.

U.S. Pat. No. 4,576,836 to Colmet et al. discloses a process for making oxide matrix CMCs by vapor phase in-situ hydrolysis of halide vapor, and includes a preliminary rigidization step of repeated liquid phase impregnation with a hydroxide, alkoxide, or organometallic, with intermediate drying/calcination.

One potentially low-cost fabrication route for carbide matrix CMCs is infiltration of a porous carbonaceous preform with a liquid containing a compound of a carbide-forming metal in solution or suspension and then heat treating the infiltrated body to form metal carbide in the interstices of the preform. The application of this method to form two-phase carbon-metal carbide bodies from porous monolithic graphite has been known and practiced for many years, as illustrated by U.S. Pat. No. 3,432,336 to Langrod et al. Other processes directed to the production of metallic carbide composites are described in U.S. Pat. No. 4,576,836, to Colmet et al., U.S. Pat. No. 4,196,230 to Gibson et al, and U.S. Pat. No. 5,759,620 to Wilson et al.

All the fabrication processes and additional steps summarized above require specialized equipment, long processing times, complex processing steps, high processing temperatures, and, in some cases, high processing pressures. They also are applicable with only a limited number of matrix and reinforcement compositions. These and other factors contribute to the high cost of CMCs, which in turn has limited their commercial acceptance.

Therefore, what is needed is a process for fabricating ceramic matrix composites that has advantages of lower cost, greater simplicity, shorter production times, and utilization for a wider range of matrix compounds.

SUMMARY OF THE INVENTION

This invention is an improved process for producing low-cost CMCs by the steps of fluid infiltration followed by pyrolysis. The process generally includes three simple process steps that may be carried out directly after one another without any intermediate steps. First, a fiber preform is infiltrated with a metalloid or metal-containing compound together with other constituents as detailed below. Next, the infiltrated preform is given repeated cycles of infiltration and low temperature heat treatment to evaporate the fluid vehicle or solvent, if used, and to convert the infused compound to an oxide matrix. Finally, after several infiltration-drying cycles, the preform is given a high temperature heat treatment at an appropriate temperature and in an appropriate atmosphere to convert the infused metal-containing compound in the matrix to metal carbide, boride or nitride. Repeated cycles of infiltration, drying, and high temperature conversion may be used to increase the matrix density. Further increases in matrix density may be achieved by additional CVI treatment.

DETAILED DESCRIPTION OF THE INVENTION

As noted above, this invention is a simple process for producing ceramic matrix composites. By "ceramic matrix composite" we mean a fibrous preform infiltrated with a single, binary, ternary, or complex non-oxide compound or mixture of compounds which is produced in situ.

In general, the procedure encompasses the steps of first infusing a fluid containing a metallic or metalloid compound one or more times into a fibrous preform. Second, the thus-infused preform is given repeated cycles of infiltration and low temperature heat treatment to evaporate the fluid vehicle and convert the infused metal-containing compound to an oxide matrix. Finally, the infused preform is then pyrolyzed, with or without additional infiltration steps, in an appropriate reduced pressure or inert atmosphere to convert the oxide matrix to a carbide, boride or nitride matrix, which together with the fibrous preform then constitutes the desired ceramic (matrix) composite. If desired, one infiltration step can be accomplished so to coat the fibers or the fibrous preform prior to application or infiltration of additional or other matrix precursor material. It is understood that the invention can be preferably and fully accomplished by practicing each of these process steps directly after one another, without the need for any intermediate steps, e.g., separation, hydration, conversion, reaction, or the like.

The fibrous preform used in this present invention is preferably made from carbon fibers, although any continuous high temperature fiber is within the scope of the invention. The fiber preform is preferably highly porous and has a low fiber volume. It is formed by methods known in the art such as, for example, air-laying, braiding, or weaving. Preform mats typically have a thickness of about 0.5 mm and about 10 mm.

The carbon or other high-temperature fibers, when used singly or as part of the preform, typically have a diameter as small as about 5 $\mu$m and as large as about 200 $\mu$m, though they may have diameters smaller or larger than these dimensions. Fiber lengths can range from about 1 mm to the maximum dimension of the preform. Although a wide variety of carbon fibers is contemplated for use in the present invention, HM carbon fibers, manufactured by Hercules, Inc. and having a diameter of about 8 $\mu$m, are preferred. Silicon carbide fibers, more preferably NICALON silicon carbide fibers, manufactured by Dow Corning and having a diameter of about 10 $\mu$m, are preferred for use in composites having silicon carbide matrices. Silicon carbide fibers may also be used in other matrices without departing from the scope of the invention.

This invention desirably employs ceramic matrix phase precursor materials that are neither extremely air- nor moisture-sensitive. For example, the precursor impregnation step can potentially be performed in the presence of water. The precursor material may be an oxide, or other pyrolyzeable or reactive compound, of the metal or metalloid constituents of the non-oxide refractories sought. For instance, it may be an alkoxide or salt, such as an isopropoxide, butoxide, acetate, nitrate, or dichloride oxide; a colloidal dispersion of an oxide, such as a nitrate-, chloride-, or acetate-stabilized aqueous sol or colloidal suspension; or a low melting point compound for melt-infiltration, such as an ethoxide or pentanedionate. It also may be an inorganic or organic metalloid-containing compound. It is understood that these and other various precursor materials may be used singly or in multiple combinations and be within the scope of the present invention if the precursor composition contains sufficient combined carbon.

Any metal or metalloid that suitably forms a refractory compound is within the scope of the present invention and is designated as M in the following description. Preferably, M is silicon or like metalloid or a member of Group IVB, VB, VIB or VIIB of the periodic table of elements. More preferably, M is silicon, titanium, zirconium, hafnium, vanadium, niobium, tantalum, chromium, molybdenum, tungsten, or manganese. Most preferably, M is silicon, zirconium, hafnium, titanium, or tantalum.

For conversion to a carbide or nitride matrix, carbon may be added to the original infiltrant if the metal compound does not contain sufficient combined carbon for the high temperature reaction step, as calculated from the reaction stoichiometry and elemental analysis of the starting materials, allowing for any loss of carbon as volatiles evolved during the pyrolysis step. The carbon may be in the form of dispersed finely divided carbon-containing powder or carbon powder, such as carbon black, or as a miscible carbon-rich liquid, such as a phenolic resin, a furfuryl alcohol-based resin, or a sugar.

For conversion to a boride matrix, boron may be added in the form of dispersed finely divided boron-containing or boron powder or as a solution of boric acid in water or an alcohol such as methanol, together with finely divided carbon powder, such as carbon black.

For conversion to a carbide or boride matrix, the high temperature conversion step generally may be carried out at a temperature of about 1400° C. or higher in an inert atmosphere or, preferably, in a vacuum. A preferred temperature range is between about 1400° C. and about 1800° C.; more preferred is between about 1400° C. and about 1600° C. Generally, if a vacuum is used, a vacuum level of less than about 1 torr is within the scope of the present invention; a vacuum level of less than about $10^{-3}$ torr is preferred. If an inert atmosphere is used, the total impurity level should be less than about 0.1%; an impurity level of less than about 0.001% is preferred.

For conversion to a nitride matrix, the high temperature conversion step is carried out at a temperature between about 1300° C. and about 1700° C. in desirably an atmosphere of nitrogen or ammonia and possibly containing carbon monoxide. A preferred temperature range is between about 1400° C. and about 1500° C.

A key feature of the present invention is that the large negative free energy of formation of carbon monoxide or boric oxide at high temperature, when combined with the large negative free energies of formation of the desired non-oxide refractories, are such that non-oxide refractories may be formed under conditions where reduction of the oxide using carbon alone to metal otherwise could not be achieved. This principle may be applied to similar systems where the non-oxide product has a sufficiently negative free energy of formation.

For the production of carbides, the overall chemical equation for this variation of the inventive process may generally be written $$MO_2 + 3C \rightarrow MC + 3CO.$$

Even at temperatures in the neighborhood 1500° C., the carbon monoxide partial pressure is sufficient that this reaction may occur if the carbon monoxide is removed, for example by a stream of inert gas or in a vacuum chamber.

In addition to the precursor materials recited above, the metalloid oxide or metal oxide and carbon may be directly incorporated through fluid impregnation using metalloid oxide or metal oxide sols mixed with carbon black. The metals or metalloids may also be present in the form of alkoxides or salts of organic acids, for which either melt impregnation or solution impregnation may be appropriate. For organic materials containing oxygen, it is believed that the metallic oxide forms an intermediate product.

The final volume of the non-oxide refractory ceramic composite is less than the volume of the preform precursors. A single process cycle can produce a fiber coating but densification of a fiber-reinforced body requires multiple process cycles. Most of the volume reduction occurs at lower temperatures than required for the carbon reduction step. It is advantageous to carry out multiple impregnation, intermediate temperature thermal treatment cycles before carrying out the high temperature conversion step.

The method can be employed to produce boride or nitride as well as carbide products. For zirconium and hafnium, if elemental boron is incorporated with the oxide and carbon, the overall reaction $$MO_2 + 2B + 2C \rightarrow MB_2 + 2CO$$

is a more favorable reaction than the carbide formation reaction at all temperatures. Below 1100° C. the formation of boric oxide is predicted, but above 1200° C. this is reduced by carbon, allowing the formation of additional boride. A preferred temperature range is between 1400° C. and 1800° C.; more preferred is between 1500° C. and 1600° C.

It is possible to use boric oxide rather than the element as the boron source. This proceeds by the overall reaction $$MO_2 + B_2O_3 + 5C \rightarrow MB_2 + 5CO.$$

Borides may also be prepared using boron as the reducing agent in place of carbon, according to the overall reaction $$3MO_2 + 10B \rightarrow 3\ MB_2 + 2B_2O_3$$

This reaction is thermodynamically favored at lower temperatures than reactions using carbon as the reducing agent. Excess $B_2O_3$ may be removed by evaporation or by heating in steam to remove the $B_2O_3$ as volatile boric acid.

If the reaction of the metal oxide and carbon is carried out in the presence of nitrogen, it is possible to form the nitride. The overall reaction is $$MO_2 + \tfrac{1}{2}N_2 + 2C \rightarrow MN + 2CO.$$

For this reaction the temperature must be carefully controlled, e.g., below about 1700° C., because at higher temperatures carbon can react with the nitride to form the carbide and release nitrogen.

The method characterized by the above reactions, for example, can be illustrated by substitution of zirconium, hafnium and silicon as the metal or metalloid (M), but it can be extended to other candidate fiber coating or matrix materials for which the combined thermodynamic stability of the non-oxide ceramic product and the coproduct carbon monoxide is sufficient to balance the thermodynamic stability of the oxide of the metal or metalloid component. The formation of other than carbide non-oxide ceramics further requires that the non-metal constituent form a more stable combination with the metal than carbon does.

Reference will now be made in detail to the present invention by means of examples.

EXAMPLE 1

This example shows the production of a zirconium carbide matrix composite using zirconium acetate as the metal compound for solution infiltration into the fibrous preform.

A braided carbon fiber preform 1.6 mm thick containing 56% by volume HM fiber was vacuum-infiltrated at room temperature with zirconium acetate solution in acetic acid containing 15–16% zirconium to which 6% by weight carbon black had been added. After each infiltration the coupon was dried at 60° C. for a minimum of 2 hours to remove the solvent and heated in argon to 500° C. for 2 hours. Fifteen infiltration-heat treatment cycles were made. Heat treatments at 1400° C. for 2 hours in an atmosphere of argon were made after the 11th and 15th infiltration cycles. The weight of the final product was 262% that of the original carbon fiber preform. Micrographic examination showed that matrix material had penetrated throughout the preform and into the fiber bundles. Analysis of selected areas by energy dispersive x-ray spectrometry (EDX) and wavelength dispersive spectrometry (WDS) showed that the matrix material contained zirconium, carbon, and oxygen with the carbon peaks 1.5 to 5 times larger that the oxygen peaks.

EXAMPLE 2

This example shows the production of a zirconium carbide matrix composite using pentanedionate for melt-infiltration of the fibrous preform.

A braided carbon fiber preform 1.6 mm thick containing 56% by volume HM fiber was melt-infiltrated by placing the preform specimen in an aluminum foil pan and completely covering it with zirconium pentanedionate powder. The pan was placed in a tube furnace, the furnace was evacuated, and the temperature was raised to 190° C. The pressure was raised to 1 atmosphere and the specimen was furnace cooled to room temperature. The specimen was heat treated in argon at 500° C. for 2 hours. Ten melt infiltration-heat treatment cycles were made. The weight of the final product was 235% that of the original carbon fiber preform. Micrographic examination showed that matrix material had penetrated throughout the preform and into the fiber bundles. Analysis of selected areas by EDX and WDS showed that the matrix material consisted of zirconium, carbon, and oxygen with the carbon peaks 0.7 to 1.7 times larger than the oxygen peaks.

EXAMPLE 3

This example shows the production of a hafnium carbide matrix composite using an acetate-stabilized acetate sol containing carbon black for slurry-infiltration of the fibrous preform.

A braided carbon fiber preform 1.6 mm thick containing 56% by volume HM fiber was vacuum-infiltrated at room temperature with a hafnium oxide sol consisting of 20% hafnium oxide in a chloride-stabilized aqueous suspension to which 3.4% by weight carbon black had been added. After each infiltration the coupon was dried at 60° C. for a minimum of 2 hours to remove the solvent. Nine infiltration-drying cycles were made. The specimen was heated in argon to 500° C. for 2 hours after the seventh cycle and at 1500°

C. for 2 hours in vacuum after the ninth cycle. The weight of the final product was 231% that of the original carbon fiber preform. X-ray diffraction analysis of the matrix material made on a companion specimen heat treated at 1400° C. for 4 hours in vacuum showed that it was composed of hafnium carbide with a minor amount of hafnium oxide, with the strongest hafnium carbide peaks 6.5 times larger than the strongest hafnium oxide peaks.

EXAMPLE 4

This example shows the production of a hafnium boride matrix composite using an acetate-stabilized acetate hafnium oxide sol containing boron powder for slurry-infiltration of the fibrous preform.

A braided carbon fiber preform 1.6 mm thick containing 56% by volume HM fiber was vacuum-infiltrated at room temperature with a hafnium oxide sol consisting of 20% hafnium oxide in a chloride-stabilized aqueous suspension to which 3.3% by weight boron powder had been added. The preform was repeatedly vacuum-infiltrated at room temperature and dried at 200° C. in air between infiltrations, then heated in vacuum at 1400° C. for 4 hours after the final infiltration-drying cycle. X-ray diffraction analysis of the matrix material made on a companion specimen heat treated at 1400° C. for 4 hours in vacuum showed that it was composed of hafnium boride with a minor amount of hafnium oxide, with the strongest hafnium carbide peaks 6.4 times larger than the strongest hafnium oxide peaks.

EXAMPLE 5

This example shows the production of a hafnium nitride matrix composite using an acetate-stabilized acetate hafnium oxide sol containing carbon black heated in nitrogen.

A braided carbon fiber preform 1.6 mm thick containing 56% by volume HM fiber was vacuum-infiltrated at room temperature with a hafnium oxide sol consisting of 20% hafnium oxide in a chloride-stabilized aqueous suspension to which 2.5% by weight carbon black had been added. The preform was repeatedly vacuum infiltrated at room temperature and dried at 200° C. in air between infiltrations, then heated in nitrogen at 1400° C. for 4 hours after the final infiltration-drying cycle. X-ray diffraction analysis of the matrix material made on a companion sample heat treated at 1400° C. for 4 hours in nitrogen showed that it was composed mainly of hafnium nitride and hafnium oxynitride with a minor amount of hafnium oxide. The strongest hafnium nitride peaks were 3.2 times larger than the strongest hafnium oxide peaks, and the strongest hafnium oxynitride peaks were 14 times larger than the strongest hafnium oxide peaks.

EXAMPLE 6

This example shows the production of a hafnium nitride matrix composite using hafnium pentanedionate.

A braided carbon preform was melt-infiltrated with hafnium pentanedionate using the procedure described in Example 2 and heat treated at 1400° C. for 4 hours in nitrogen after the final infiltration cycle. X-ray diffraction analysis of the matrix material made on a companion sample heat treated at 1400° C. for 4 hours in nitrogen showed that it was composed mainly of hafnium nitride with minor amounts of hafnium oxynitride and hafnium oxide. The strongest hafnium nitride peaks were 3.5 times larger than the strongest hafnium oxide peaks, and the strongest hafnium oxynitride peaks were 0.7 times larger than the strongest hafnium oxide peaks.

EXAMPLE 7

This example shows the production of a hafnium carbide matrix composite using an chloride-stabilized hafnium oxide sol containing carbon black and additional CVI treatment to enhance the density of the final product.

A 2 in. long section from a 2 in. diameter braided HM carbon fiber preform was vacuum-infiltrated at room temperature with a hafnium oxide sol consisting of 20% hafnium oxide in a chloride-stabilized aqueous suspension to which 3.4% by weight carbon black had been added. The preform was vacuum-infiltrated at room temperature for 13 cycles and dried at 200° C. in air between infiltrations. It was heat treated in vacuum at 1600° C. for 2 hours after the 4th, 8th, and 13th cycles. The weight after the final heat treatment was 84% that of the original carbon fiber preform. The preform was then subjected to additional CVI densification using a mixture of $HfCl_4$, propane, and argon and a deposition temperature of 1000° C. The $HfCl_4$ was generated in situ by flowing chlorine over hafnium sponge.

EXAMPLE 8

This example shows the synthesis of a silicon carbide matrix using $SiO_2$ as the metalloid compound.

A mixture of 20 gm of LUDOX, a 40% by weight colloidal dispersion of $SiO_2$ in water manufactured by DuPont Aerospace, and 4.8 grams of carbon black was prepared. The mixture was dried at 95° C. and divided into four portions for heat treatment in vacuum to convert the $SiO_2$ to SiC according to the equation

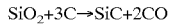

$$SiO_2 + 3C \rightarrow SiC + 2CO$$

and under the temperature schedule illustrated in the following table:

TABLE 1

| Sample Number | Temperature Range (° C.) | Duration (hours) | Relative Principal X-ray Count |
| --- | --- | --- | --- |
| 1 | 1200 | 1.42 | 225 |
|  | 1300 | 1.25 |  |
|  | 1400 | 0.25 |  |
| 2 | 1400 | 4.25 | >500 |
| 3 | 1500–1598 | 2.83 | >1000 |
| 4 | 1570–1580 | 2.00 | >1000 |

X-ray diffraction analysis of the matrix material in test sample 1 revealed the presence of a small amount of SiC as a reaction product along with some residual $SiO_2$. This is evidenced in a low relative count of approximately 225 obtained at the β-SiC Bragg angle of approximately 36 degrees. These results indicate that the reaction to SiC at these temperatures was largely confined to the surface of the test sample.

X-ray diffraction results for sample 2 (1400° C.) yielded a SiC reaction that proceeded much further and the presence of a higher amount of SiC. This is confirmed by a relative β-SiC count that exceeded 500.

Finally, at the higher temperatures of the experiments associated with samples 3 and 4, the x-ray diffraction test results showed a complete reaction to SiC, as confirmed by a relative β-SiC count that exceeded 1000. There was no evidence of any residual $SiO_2$.

Many alterations and modifications may be made by those having ordinary skill in the art without departing from the spirit and scope of the invention. The illustrated variations have been used only for the purposes of clarity and should not be taken as limiting the invention as defined by the following claims.

What is claimed is:

1. A method of fabricating a ceramic carbide, boride, or nitride matrix composite comprising:
   (a) infiltrating a porous fiber preform with a precursor composition comprising a fluid vehicle containing a non-metal-containing compound where the non-metal is selected from carbon, boron and nitrogen and a metal-containing compound where the metal is selected from the group consisting of titanium, zirconium, hafnium, vanadium, niobium, tantalum, chromium, molybdenum, tungsten, and manganese and the metal-containing compound is decomposable to an oxide;
   (b) heating the preform sufficient to decompose the metal-containing compound to an oxide matrix and to evaporate at least a portion of the fluid vehicle;
   (c) sequentially repeating said infiltrating and heating steps; and
   (d) subjecting the infiltrated preform to a heat treatment sufficient to convert the oxide matrix to a matrix of a carbide, boride, or nitride compound comprising the metal and the non-metal.

2. The method according to claim 1 additionally comprising the step of increasing the matrix density by chemical vapor infiltration.

3. The method of claim 1 where the metal is selected from the group consisting of zirconium, hafnium, titanium, and tantalum.

4. A method of fabricating a ceramic matrix composite consisting essentially of the inclusive steps of:
   (a) infiltrating a porous fiber preform with a precursor composition comprising a fluid vehicle containing carbon and a compound having a metal selected from the group consisting of zirconium, hafnium, titanium and tantalum;
   (b) heating the preform sufficient to decompose the metal-containing compound to an oxide matrix and to evaporate at least a portion of the fluid vehicle; and
   (c) subjecting the infiltrated preform to a heat treatment sufficient to convert the oxide matrix to a metal carbide.

5. The method according to claim 4 wherein the step of subjecting the infiltrated preform to a heat treatment is carried out at a temperature of about 1400° C. or higher.

6. The method according to claim 5 wherein the step of subjecting the infiltrated preform to a heat treatment is carried out in substantially a vacuum.

7. The method according to claim 5 wherein the step of subjecting the infiltrated preform to a heat treatment is carried out in a substantially inert atmosphere.

8. A method of fabricating a ceramic matrix composite comprising:
   (a) infiltrating a porous fiber preform with a precursor composition comprising a fluid vehicle containing boron and a compound having a metal selected from the group consisting of zirconium, hafnium, titanium and tantalum;
   (b) heating the preform sufficient to decompose the metal-containing compound to an oxide matrix and to evaporate at least a portion of the fluid vehicle; and
   (c) subjecting the infiltrated preform to a heat treatment sufficient to convert the oxide matrix to a metal boride.

9. The method according to claim 8 wherein the step of subjecting the infiltrated preform to a heat treatment is carried out at a temperature of about 1400° C. or higher.

10. The method according to claim 9 wherein the step of subjecting the infiltrated preform to a heat treatment is carried out in substantially a vacuum.

11. The method according to claim 9 wherein the step of subjecting the infiltrated preform to a heat treatment is carried out in a substantially inert atmosphere.

12. The method according to claim 1 wherein the fluid vehicle is in the form of a melt.

13. The method according to claim 1 wherein the fluid vehicle is in the form of a dispersion.

14. The method according to claim 1 wherein the fluid vehicle is in the form of a solution.

15. The method according to claim 1 wherein the preform is carbonaceous.

16. The method according to claim 15 wherein said carbonaceous preform comprises carbon fibers.

17. The method according to claim 1 wherein the preform is a metal carbide.

18. The method according to claim 1 wherein the preform is a metal oxide.

19. A composite fabricated according to the method of claim 1.

20. A composite fabricated according to the method of claim 4.

21. A composite fabricated according to the method of claim 8.

* * * * *